United States Patent [19]

Nakahara

[11] Patent Number: 5,001,575
[45] Date of Patent: Mar. 19, 1991

[54] APPARATUS AND METHOD FOR IMAGE REPRODUCTION BY RANDOM SELECTOR OF INTERPOLATION DATA

[75] Inventor: Masanao Nakahara, Shiga, Japan

[73] Assignee: Dainippon Screen Mfg. Co., Ltd., Kyoto, Japan

[21] Appl. No.: 434,949

[22] Filed: Nov. 9, 1989

[30] Foreign Application Priority Data

Nov. 17, 1988 [JP] Japan .................. 63-291838

[51] Int. Cl.$^5$ ............................................. H04N 1/40
[52] U.S. Cl. ................................. 358/451; 358/428
[58] Field of Search ............... 358/428, 429, 447, 448, 358/452, 459, 296, 451

[56] References Cited

U.S. PATENT DOCUMENTS

| | | | |
|---|---|---|---|
| 4,163,605 | 8/1989 | Yamada | 358/80 |
| 4,381,547 | 4/1983 | Ejiri | 358/448 |
| 4,712,141 | 12/1987 | Tomohisa | 358/80 |
| 4,827,433 | 5/1989 | Kamon | 358/296 |
| 4,833,531 | 5/1989 | Abe et al. | 358/451 |
| 4,920,571 | 4/1990 | Abe et al. | 358/428 |

Primary Examiner—Edward L. Coles, Sr.
Assistant Examiner—Jerome Grant, II.
Attorney, Agent, or Firm—Lowe, Price, Leblanc, Becker & Shur

[57] ABSTRACT

An apparatus for reproducing an image with a desired magnification other than that expressed in an integer comprises a key switch for inputting the desired magnification. When reproducing the image with the selected magnification, it is necessary to interpolate pixel dots by increasing or decreasing the number of pixel dots for each predetermined region. The pixel dots are output in accordance with interpolation tables.

The image reproducing apparatus further comprises an interpolation table preparing device for preparing a plurality of interpolation tables having different positions for interpolating the pixel dots in each predetermined region in accordance with the desired magnification, and a switching device for switching among the plurality of interpolation tables at random for each scan line. Since the plurality of interpolation tables are switched for each scan line, no regular patterns appear on the reproduced images.

22 Claims, 10 Drawing Sheets

FIG.5

| PIXEL NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | ... |
|---|---|---|---|---|---|---|---|---|---|---|---|---|---|---|---|---|---|---|---|---|---|---|---|---|---|---|---|---|
| INTERPOLATION DATA | 1 | 1 | 1 | 1 | 1 | 1 | 2 | 1 | 1 | 1 | 1 | 1 | 1 | 2 | 1 | 1 | 1 | 1 | 1 | 2 | 1 | 1 | 1 | 1 | 1 | 1 | 2 | ... |
| DECIMAL PORTION OF A | — | 0.30 | 0.45 | 0.60 | 0.75 | 0.90 | 0.05 | 0.20 | 0.35 | 0.50 | 0.65 | 0.80 | 0.95 | 0.10 | 0.25 | 0.40 | 0.55 | 0.70 | 0.85 | 0 | 0.15 | 0.30 | 0.45 | 0.60 | 0.75 | 0.90 | 0.05 | ... |
| VALUE OF A | 1.30 | 1.45 | 1.60 | 1.75 | 1.90 | 2.05 | 1.20 | 1.35 | 1.50 | 1.65 | 1.80 | 1.95 | 2.10 | 1.25 | 1.40 | 1.55 | 1.70 | 1.85 | 2.00 | 1.15 | 1.30 | 1.45 | 1.60 | 1.75 | 1.90 | 2.05 | 1.20 | ... |

FIG.6

| PIXEL NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... |
|---|---|---|---|---|---|---|---|---|---|---|---|---|---|---|---|---|---|---|---|---|---|---|---|---|---|---|
| TABLE NO.1 | 1 | 1 | 1 | 1 | 1 | 1 | 2 | 1 | 1 | 1 | 1 | 1 | 1 | 2 | 1 | 1 | 1 | 1 | 1 | 2 | 1 | 1 | 1 | 1 | 1 | ... |
| TABLE NO.2 | 1 | 1 | 1 | 1 | 1 | 2 | 1 | 1 | 1 | 1 | 1 | 1 | 2 | 1 | 1 | 1 | 1 | 1 | 2 | 1 | 1 | 1 | 1 | 2 | 1 | ... |
| TABLE NO.3 | 1 | 1 | 1 | 1 | 2 | 1 | 1 | 1 | 1 | 1 | 2 | 1 | 1 | 1 | 1 | 1 | 2 | 1 | 1 | 1 | 1 | 1 | 1 | 1 | 1 | ... |
| TABLE NO.4 | 1 | 2 | 1 | 1 | 1 | 1 | 1 | 1 | 2 | 1 | 1 | 1 | 1 | 1 | 2 | 1 | 1 | 1 | 1 | 1 | 1 | 2 | 1 | 1 | 1 | ... |

FIG.7

| PIXEL NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | ... |
|---|---|---|---|---|---|---|---|---|---|---|---|---|---|---|---|---|---|---|---|---|---|---|---|---|---|---|---|---|
| INTERPOLATION DATA | 0 | 1 | 1 | 1 | 1 | 0 | 1 | 1 | 1 | 1 | 1 | 0 | 1 | 1 | 1 | 1 | 0 | 1 | 1 | 1 | 1 | 1 | 0 | 1 | 1 | 1 | 1 | ... |
| DECIMAL PORTION OF A | — | 0.64 | 0.46 | 0.28 | 0.1 | 0.92 | 0.74 | 0.56 | 0.38 | 0.2 | 0.02 | 0.64 | 0.66 | 0.48 | 0.3 | 0.12 | 0.94 | 0.76 | 0.58 | 0.4 | 0.22 | 0.04 | 0.86 | 0.68 | 0.5 | 0.32 | 0.14 | ... |
| VALUE OF A | 1.64 | 1.46 | 1.28 | 1.1 | 0.92 | 1.74 | 1.56 | 1.38 | 1.2 | 1.02 | 0.84 | 1.66 | 1.48 | 1.3 | 1.12 | 0.94 | 1.76 | 1.58 | 1.4 | 1.22 | 1.04 | 0.86 | 1.68 | 1.5 | 1.32 | 1.14 | 0.96 | ... |

FIG.8

| PIXEL NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | ... |
|---|---|---|---|---|---|---|---|---|---|---|---|---|---|---|---|---|---|---|---|---|---|---|---|---|---|---|---|---|
| TABLE NO.1 | 0 | 1 | 1 | 1 | 1 | 0 | 1 | 1 | 1 | 1 | 1 | 0 | 1 | 1 | 1 | 1 | 0 | 1 | 1 | 1 | 1 | 1 | 0 | 1 | 1 | 1 | 1 | ... |
| TABLE NO.2 | 1 | 1 | 1 | 1 | 1 | 1 | 1 | 1 | 1 | 1 | 0 | 1 | 1 | 1 | 1 | 0 | 1 | 1 | 1 | 1 | 1 | 0 | 1 | 1 | 1 | 1 | 1 | ... |
| TABLE NO.3 | 1 | 1 | 1 | 0 | 1 | 1 | 1 | 1 | 1 | 0 | 1 | 1 | 1 | 1 | 1 | 1 | 1 | 1 | 0 | 1 | 0 | 1 | 1 | 1 | 1 | 1 | ... | |
| TABLE NO.4 | 1 | 0 | 1 | 1 | 1 | 1 | 0 | 1 | 1 | 1 | 1 | 1 | 0 | 1 | 1 | 1 | 1 | 1 | 1 | 0 | 1 | 1 | 1 | 1 | 1 | | | ... |

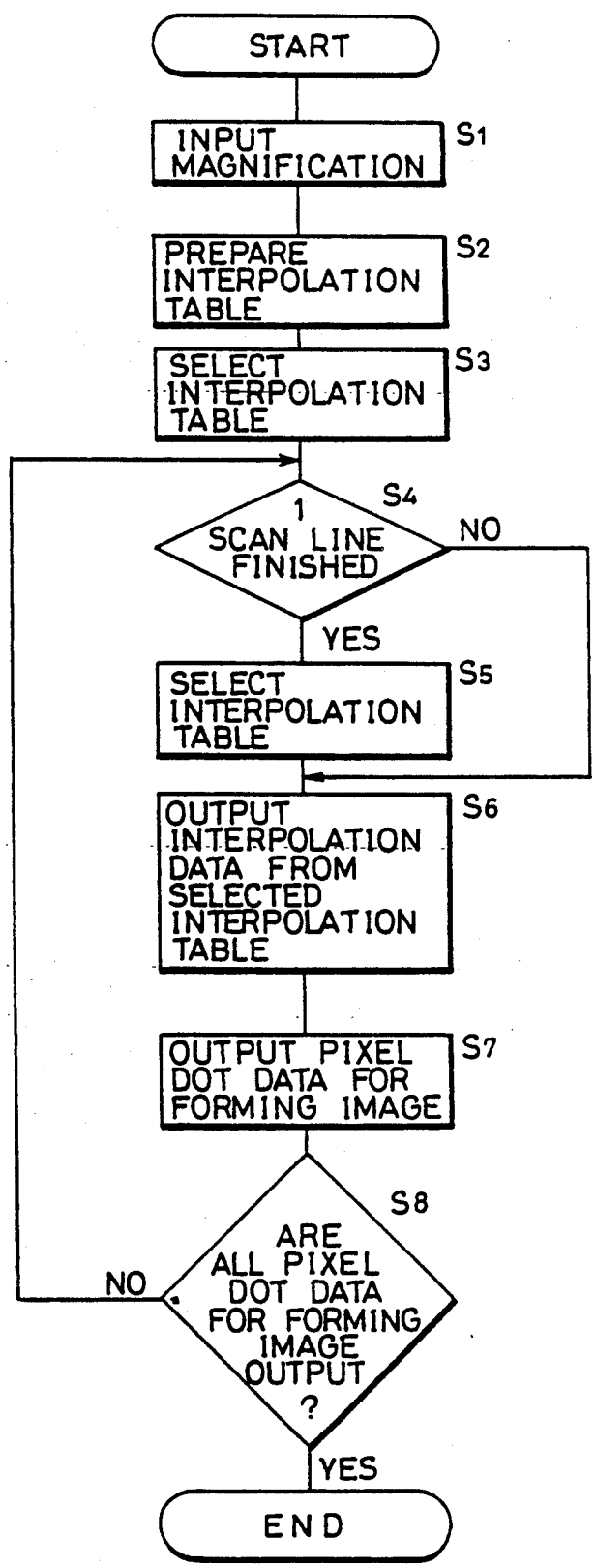

| SCAN LINE NO. \ PIXEL NO. | 1 | 2 | 3 | 4 | 5 | 6 | 7 | 8 | 9 | 10 |
|---|---|---|---|---|---|---|---|---|---|---|
| 1 | 1 | 2 | 1 | 1 | 1 | 2 | 1 | 1 | 1 | 2 |
| 2 | 2 | 2 | 1 | 1 | 2 | 1 | 1 | 2 | 1 | 1 |
| 3 | 1 | 1 | 1 | 1 | 2 | 1 | 1 | 1 | 1 | 1 |
| 4 | 1 | 1 | 2 | 1 | 1 | 1 | 1 | 2 | 2 | 1 |
| 5 | 1 | 2 | 1 | 1 | 1 | 2 | 1 | 1 | 1 | 1 |
| 6 | 2 | 1 | 1 | 2 | 1 | 2 | 1 | 1 | 1 | 1 |
| 7 | 1 | 1 | 1 | 1 | 2 | 1 | 1 | 1 | 1 | 1 |
| 8 | 1 | 1 | 2 | 1 | 1 | 1 | 1 | 2 | 2 | 1 |
| 9 | 1 | 2 | 1 | 1 | 1 | 2 | 1 | 1 | 1 | 1 |

| PIXEL No. → | 1 | 2 | 3 | 4 | 5 | 6 | 7 | 8 | 9 | 10 |
|---|---|---|---|---|---|---|---|---|---|---|
| INPUT PIXEL DOT DATA | $S_1$ | $S_2$ | $S_3$ | $S_4$ | $S_5$ | $S_6$ | $S_7$ | $S_8$ | | |
| 1.25 TIMES | 1 | 1 | 1 | 2 | 1 | 1 | 1 | 2 | | |
| 0.75 TIMES | 1 | 1 | 1 | 0 | 1 | 1 | 1 | 0 | | |
| 1.25 TIMES | $S_1$ | $S_2$ | $S_3$ | $S_4$ | $S_4$ | $S_5$ | $S_6$ | $S_7$ | $S_8$ | $S_8$ |
| 0.75 TIMES | $S_1$ | $S_2$ | $S_3$ | $S_5$ | $S_6$ | $S_7$ | | | | |

{ INTERPOLATION PATTERN
{ OUTPUT PIXEL DOT DATA

→ MAIN
↓ SUB

SIZE OF 1 DOT

ORIGINAL IMAGE

IMAGE OF 0.75 TIMES

IMAGE OF 1.25 TIMES

APPARATUS AND METHOD FOR IMAGE REPRODUCTION BY RANDOM SELECTOR OF INTERPOLATION DATA

BACKGROUND OF THE INVENTION

1. Field of the Invention

This invention relates to an apparatus of and a method for image reproducing with variable reproduction scale used in image scanning and recording systems such as monochrome scanner and facsimile machines, and more particularly to an apparatus of and a method for image reproducing with variable reproduction scale capable of scanning and recording an original image as enlarged or reduced in size.

2. Description of the Prior Art

A method for image reproducing with variable reproduction scale prior to the present invention is disclosed in Japanese Patent Publication No. 60-37464, for example. According to this publication, pixel dot data of an original image corresponding to a single scan line are written in time series into a buffer memory. When reproducing the image, the pixel dot data are read out from the memory as follows. For enlarging the image, a read-out address is repeatedly applied to the buffer memory with a predetermined frequency corresponding to a desired magnification. For reducing the image, the read-out address application is skipped. The number of pixel dot data is thereby increased or decreased for output to a recording head for exposing a photosensitive film. As a result, an enlarged or reduced reproduced image is obtained.

The concept of the term "interpolation" appearing later in this specification is explained now. The term interpolation as used herein embraces the "addition" and "skipping" of pixel dot data. Further, the pixel dot data include not only binary pixel data as expressed in "H" and "L" but tints having a uniform half tone distribution of dots.

A specific example of methods for reproducing an enlarged or reduced image will be described referring to FIG. 13. Pixel dot data S1, S2, S3, S4 and so on are written into a buffer memory. It is assumed here that the image is enlarged by 1.25 times. Since 1.25 is 5/4, an interpolation pattern is set to repeat "1, 1, 1 and 2" as a reference pattern for determining the number of times each pixel dot data is read out.

In reading out four pixel dot data S1, S2, S3 and S4, they are read out, for example, as S1, S2, S3, S4 and S4, with S4 added once. Subsequently, the pixel dot data S4 is likewise added cyclically once in every four times. As a result, the original image is reproduced in a 1.25 times enlargement.

When the original is reduced by 0.75 times, the following operation is carried out. Since 0.75 is ¾, an interpolation pattern for repeating "1, 1, 1 and 0" is set as a reference. The "0" here means skipping of the pixel dot data. For the four pixel dot data S1, S2, S3 and S4, data S1, S2 and S3 are read out skipping S4. Subsequently, the pixel dot data S4 is likewise skipped cyclically once in every four times. As a result, the original image is reproduced in a 0.75 times reduction.

The above addition or skipping is carried out whether pixel dot data Si is "H" (black) or "L" (white). The interpolation pattern serving as the reference is variable with magnification.

In conventional practice, as described above, the position for interpolating the data is fixed by the interpolation pattern calculated for each magnification. The original image, therefore, is subjected to interpolation every several pixels when an original image is enlarged or reduced by a magnification not expressed in an integer. As a result, the interpolated pixels constitute pattern elements absent from the original image. Such example are shown in FIGS. 14A through 14C. FIG. 14B shows an enlarged reproduction of the original image shown in FIG. 14A, which is obtained by enlarging the latter in a main scanning direction by 1.25 times in the manner illustrated in FIG. 13. FIG. 14C shows a reduced reproduction of the original image of FIG. 14A obtained by reducing the latter by 0.75 times.

As shown in FIG. 14B, one pixel is added to every fourth pixel output when the original image is enlarged by 1.25 times. On the other hand, as sown in FIG. 14C, the pixel dot data for every fourth pixel is omitted when the original image is reduced by 0.75 times.

Regular patterns will appear in portions enclosed with solid lines in each reproduced image. These patterns constitute interfering streaks out of harmony with the rest of the image, and deteriorate image quality. In the examples shown in FIGS. 14B and 14C, the magnification is effected in the main scanning direction only. The reason is that, in a copying machine or the like, magnification is effected in the subscanning direction by varying the scan speed.

When the original image is enlarged by the number of times expressed in an integer, all the dot data are repeated that number of times, thereby interpolating all pixels evenly. Consequently, the above-noted problem will not arise.

SUMMARY OF THE INVENTION

It is, accordingly, an object of this invention to eliminate the interfering streaks appearing on a reproduction of an original image as a result of data interpolation made by an image reproducing apparatus with variable reproduction scale.

Another object of this invention is to improve the quality of an image reproduced by an image reproducing apparatus in a magnification not expressed in an integer.

A further object of this invention is to provide an image reproducing method with variable reproduction scale capable of eliminating the interfering streaks due to data interpolation effected in reproducing an original image.

A still further object of the invention is to provide an image reproducing method assuring improved quality of an image reproduced in a magnification not expressed in an integer.

The above objects of this invention are achieved by an image reproducing apparatus with variable reproduction scale comprising the components set out hereunder. That is, an apparatus according to the present invention for reproducing an objective image by magnifying an original image with a magnification other than that expressed in an integer, comprises an image data generating device for outputting image data corresponding to each pixel of the original image, an input device for inputting a reproducing magnification, and an instruction data generating device for outputting instruction data. The instruction data instruct interpolation processing on the image data in accordance with the reproducing magnification, and include interpolation data indicative of interpolating positions within a predetermined region based on the reproducing magnification. The image reproducing apparatus further comprises an interpolating device for interpolating the image data in accordance with the instruction data, a recorder for recording the objective image scan line after scan line in accordance with the image data as interpolated, and a switching device for irregularly varying the interpolation data with predetermined timing, whereby the interpolating positions vary irregularly within the predetermined region.

The image reproducing apparatus according to this invention comprises the above components. The positions of the interpolation data for varying magnification of the original image are switched at random with predetermined timing. As distinct from the prior art, the positions of the interpolation data are not cyclically fixed. Therefore, the regular patterns as formed in the prior art do not occur. Consequently, this magnifying and reproducing apparatus is capable of eliminating the interfering streaks due to the interpolation of data occurring when the original image is reproduced.

Preferably, the instruction data generating device prepares a plurality of the instruction data having different output positions of the interpolation data within the predetermined region, the switching device being operable to effect switching among the plurality of the instruction data.

Preferably, with the image reproducing apparatus comprising the foregoing components, a plurality of groups of the interpolation data having different output positions of the interpolation data are prepared, which are switchable at random for each scan line, for example. Consequently, the image reproducing apparatus has a simple construction and yet is capable of reliably eliminating the interfering streaks due to the interpolation of data occurring when the original image is reproduced.

In a different aspect of this invention, a method of reproducing an image from pre-recorded image data with a selected magnification other than that expressed in an integer is provided, which comprises the steps of inputting the selected magnification, and preparing instruction data for outputting pixel dot data to form the image. The instruction data include interpolation data for adding/skipping the pixel dot data to/from each predetermined region in accordance with the selected magnification. The image reproducing method further comprises the step of switching positions of the interpolation data within the predetermined region at random with predetermined timing.

In a further aspect of this invention, the positions of the interpolation data for forming an image with a selected magnification are switched at random with predetermined timing for each scan line, for example. As distinct from the prior art, therefore, the positions of the interpolation data are not fixed all the time. Thus, an image reproducing method is provided which assures improved quality of a reproduced image since no regular patterns appear on the image formed with a selected magnification.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5 through 8 are views illustrating methods of preparing the interpolation tables according to the first embodiment of this invention;

FIG. 9 is a flow chart showing the operation of the image processing section according to this invention;

DESCRIPTION OF THE PREFERRED EMBODIMENTS (1) First Embodiment

Figure 1:
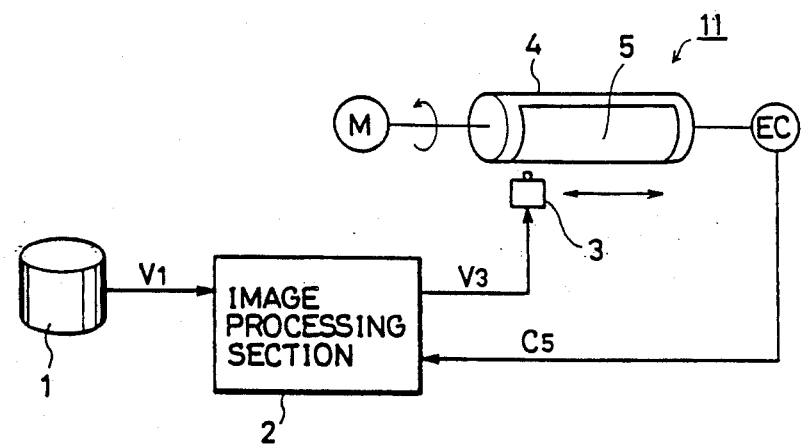
FIG. 1 is a schematic view of the construction of an image scanning and recording apparatus embodying this invention.

A reproducing apparatus embodying this invention will be described with reference to FIG. 1.

The illustrated magnifying and reproducing apparatus comprises an image memory 1 such as a magnetic disk for storing pixel dot data V1 of an original image, an image processing section 2 connected to the image memory 1 for carrying out interpolation processing according to this invention, and an image recording device 11 for recording an image based on pixel data V3 output from the image processing section 2. The image recording device 11 includes a recording head 3 for receiving the output pixel data V3 and carrying out exposure by turning a laser beam or the like on and off, and a recording cylinder 4 rotatable by a motor M. A photosensitive film 5 is secured to the recording cylinder 4 for recording an enlarged or reduced copy image thereon. The recording cylinder 4 has a rotary shaft carrying an encoder EC for generating an output transfer clock C5 (described later) to synchronize data corresponding to one scan line of the image as read out with a recording position.

Figure 2:
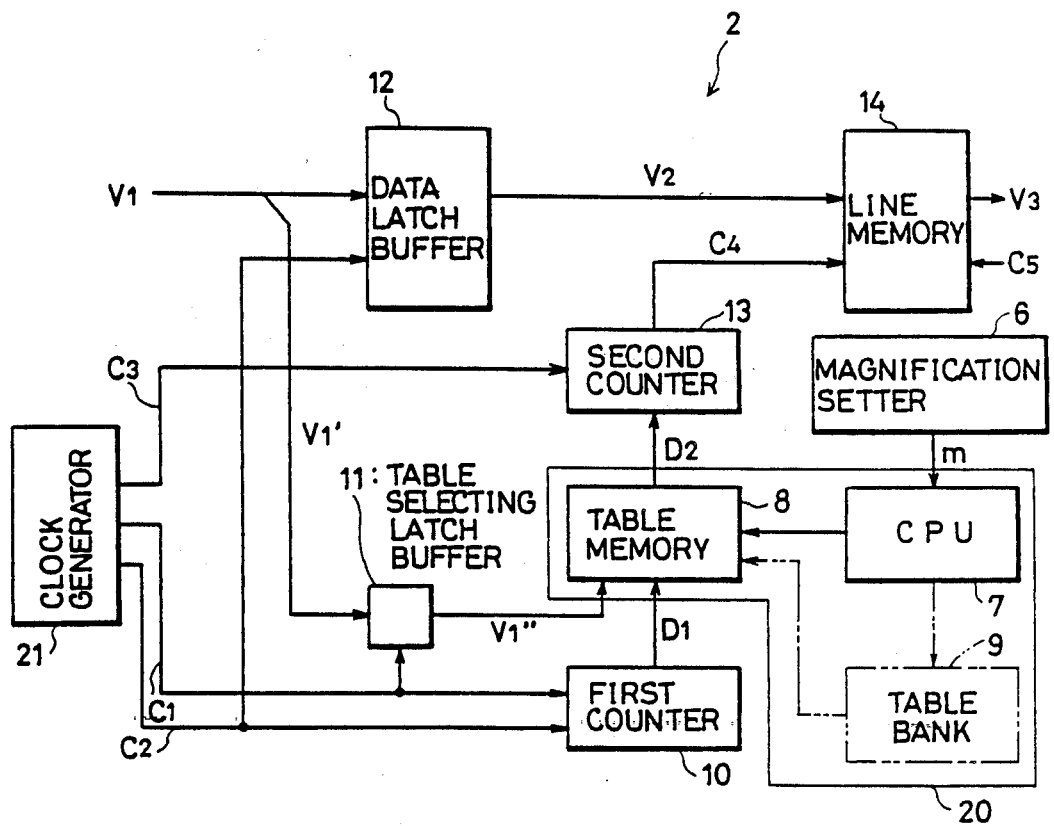
FIG. 2 is a block diagram showing details of an image processing section shown in FIG. 1.

The image processing section 2 shown in FIG. 1 will be described with reference to FIG. 2. The image processing section 2 of the reproducing apparatus according to this invention includes a magnification setter 6 for setting a desired magnification, an interpolation table preparing device 20 connected to the magnification setter 6 for preparing a plurality of interpolation tables (tables showing the modes of interpolation in the form of interpolation patterns), which will be described in detail later, in accordance with the set magnification, a table selecting latch buffer 11 connected to the interpolation table preparing device 20 for selecting an appropriate interpolation table from the plurality of interpolation tables in response to the pixel dot data V1 and so on, a line memory 14 for storing pixel dot data corresponding to one scanning line to which appropriate interpolation data have been added in accordance with the selected interpolation table, and a clock generator 21 for generating clock signals. The interpolation table preparing device 20 includes a CPU 7 for carrying out arithmetic operations to prepare the plurality of interpolation tables in accordance with the set magnification, and a table memory 8 for storing the prepared interpolation tables. The clock generator 21 outputs a main scan starting clock C1 for starting a main scan, a synchronizing clock C2 for reading out pixel dot data V1, and a clock C3 for inputting the pixel dot data to the line memory 14 in accordance with the interpolation data. Operations of the image processing section 2 will be described later.

Next, the manner in which the interpolation table preparing device 20 prepares the interpolation tables will be described.

(1) First Interpolation Table Preparing Method

In the first method of preparing the interpolation tables, a plurality (four types in this example) of interpolation patterns are prepared for respective magnification. A method of preparing a basic interpolation table (hereinafter referred to as interpolation table No. 1) will be described first with reference to FIG. 3.

At step S11, magnification m is input. At step S13, the program is initialized with the value of n indicative of a pixel position set to 1 and variable t to 0. In step S15 the variable A is set by adding t to magnification m. Then, at step S17, variable A is divided into an integer portion r and decimal portion t. At step S19, integer r is output as the nth interpolation data which is written into the table memory 8. Thus, at first, the integer portion of magnification m is output as the first interpolation data. The value of interpolation data indicates the number of times the image dot data of the original image in the reading order is read out.

Subsequently, step S21 judges whether or not the value of n equals to a predetermined value corresponding to one scan line. If step 21 finds that the data for one scan line have been output, the preparation of interpolation table No. 1 is completed. Otherwise, 1 is added to n at a step 23 and the program returns to step S15 Steps S15 through S19 are repeated until the value of n equals to the data for one scan line, to complete interpolation table No. 1.

Next, a method for preparing interpolation tables Nos. 2 to 4 based on interpolation No. 1 will be described with reference to FIG. 4.

Interpolation tables Nos. 2 to 4 are prepared to have different orders of interpolation data from interpolation table No. 1 and one another. First, at step S31, a required number P of interpolation tables (P=4 in this example) and magnification m are input. At step S33, magnification m is indicated as the sum of integer r and decimal t. At step 35, the program is initialized whereby the decimal portion of magnification m is replaced with $Q_0$. If $Q_0$ is found equal to or smaller than 0.5 at step S37, Q is made equal to $Q_0$ at step S39. If $Q_0$ is greater than 0.5, Q is made $1-Q_0$ at step S41. Variable Q here shows the reciprocal of a cycle period. When the value of Q has been determined as above, the program moves to step S43 to calculate $R=1/(Q \times P)$. Variable R here shows displacements or phase differences of the interpolation data among the interpolation tables. If step S45 finds R to be smaller than 1, the program goes to step S47. At step S47, 1 is added to the value of b, and at step S49 data of interpolation table No. 1 is shifted by an amount corresponding to a (b−1) pixel or pixels for the bth interpolation table. Step S51 judges whether or not the value of b is equal to the input number of interpolation tables to be prepared. The program keeps returning to step S47 until the input number of interpolation tables are prepared. In other words, when R is smaller than 1, interpolation tables Nos. 1 to 4 are formed by successively shifting the interpolation data in interpolation table No. 1 pixel by pixel toward a scan starting point.

If step S45 finds R to be equal to or greater than 1, 1 is added to b at step S53. At step S55, B is derived from an equation $B=R+Rt$ and, at step S57, B is indicated as the sum of integer D and decimal Bt. At step S59, the bth interpolation table is prepared by shifting the data in the (b−1)th interpolation table by integer D towards the scan starting point. Step S61 judges whether the value of b is equal to the number of interpolation tables or not. The program repeats steps S53 through S59 until the number of interpolation tables is reached.

Thus, when R is equal to or greater than 1, interpolation tables No. 2 is formed by shifting each interpolation data in interpolation table No. 1 by the value of the integer portion of R toward the scan starting point. The remaining interpolation tables are formed by shifting each interpolation data in the immediately preceding table by the value of the integer portion of B toward the scan starting point (e.g. interpolation table No. 3 is prepared on the basis of interpolation table No. 2).

To facilitate understanding, the case of preparing the interpolation tables where magnification m is 1.15 will be described hereunder with reference to FIGS. 5 and 6.

Since the 1.15 magnification m has integer 1, the interpolation data for pixel No. 1 in interpolation table No. 1 is 1 as shown in the first and second rows in FIG. 5. Next, magnification m has a decimal portion 0.15, which is added to the value of magnification m 1.15 to make the value of A 1.30. Since the integer portion of A is 1, the interpolation data for pixel No. 2 is 1. The decimal portion of A is 0.30 which is added to the value of magnification m to make 1.45. This value is a new value of A (i.e. 1.45). This operation is repeated for all the pixels constituting one scan line thereby to prepare interpolation table No. 1 as shown in FIG. 5.

Looking over the interpolation data, it will be seen that the decimal portion of A for pixel No. 20 is zero, and that the value of A for pixel No. 21 is the same as for pixel No. 1. This means that the group of data for pixels Nos. 1 through 20 constitute the basic interpolation table for this magnification, which appear repeatedly. The group of data constituting the basic interpolation table include the value of interpolation data showing 2 at positions corresponding to three pixels. Accordingly, the number of pixel dot data to be read out is; $20+3=23$. The value 1.15 derived from the equation $23/20=1.15$ equals to magnification m. The pixels to be repeated are Nos. 7, 14 and 20 which are in an approximately equidistant distribution.

The manner in which interpolation tables Nos. 2 to 4 are prepared will be described next with reference to FIG. 6.

The number P of interpolation tables required is 4. The 1.15 magnification m has the 0.15 decimal portion $Q_0$. Since $Q_0$ is equal to or smaller than 0.5, $Q=Q_0=0.15$. Since $R=1/(0.15 \times 4)=1.667 \geq 1$, interpolation table No. 2 is formed by shifting each interpolation data in table No. 1 toward the scan starting point by one pixel which corresponds to the value of the integer portion of R. Next, since the decimal portion of R is 0.667, the sum B of the decimal portion and the value 1.667 of R is 2.334. Thus, interpolation table No. 3 is formed by shifting each interpolation data in table No. 2 toward the scan starting point by two pixels which correspond to the value of the integer portion of B.

Further, since the decimal portion of B is 0.334, the sum of this decimal portion and the value of R makes B=2.001. Interpolation table No. 4 is formed by shifting each interpolation data in table No. 3 toward the scan starting point by two pixels which correspond to the value of the integer portion of B.

FIGS. 7 and 8 show an example of preparing interpolation tables for a 0.82 magnification.

Next, the manner in which the image processing section 2 operates will particularly be described with reference to FIG. 2.

Figure 3:
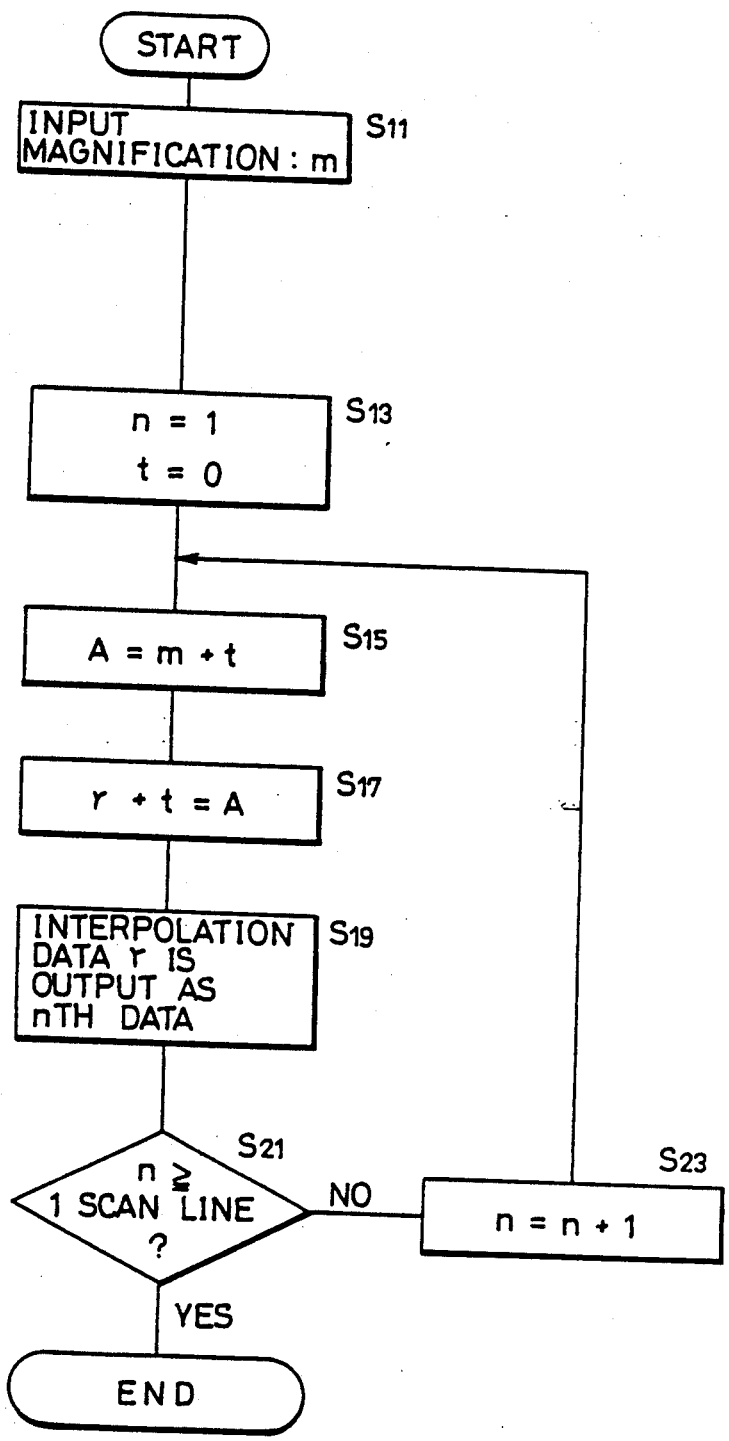
FIGS. 3 and 4 are flow charts showing a process of preparing interpolation tables according to a first embodiment of this invention.
Figure 4:
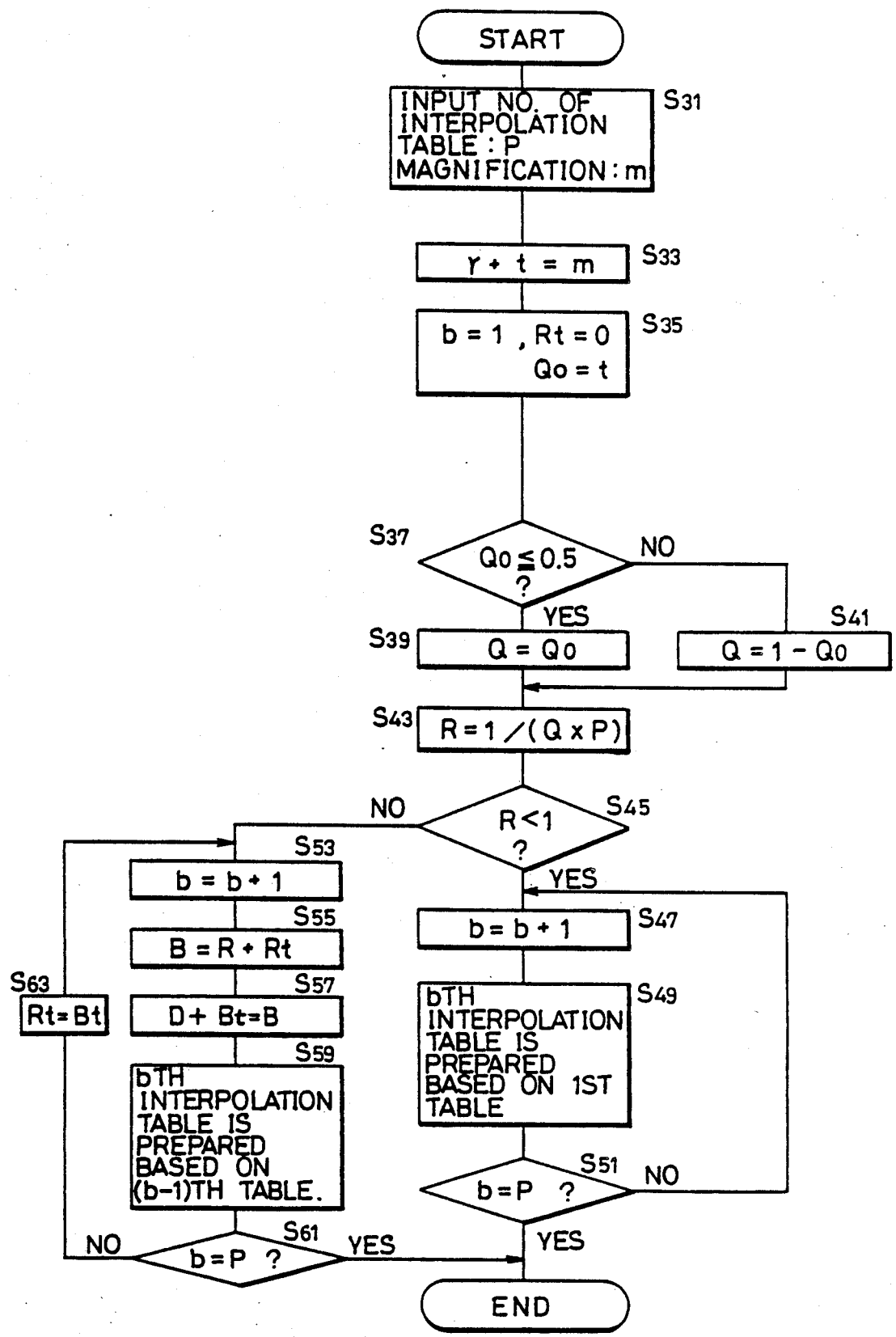

Upon input of desired magnification m from the magnification setter 56, CPU carries out the arithmetic operations according to magnification m as shown in the flow charts of FIGS. 3 and 4 to prepare the four types of interpolation tables No. 1 to 4, which are written into the table memory 8.

Groups of interpolation tables prepared beforehand in sets of four tables Nos. 1 to 4 for various rates of enlargement and reduction may be stored in a table bank 9 shown in a two-dots-dash line, and CPU 7 may set a corresponding interpolation table to the table memory 8 by reading out from the table bank 9 in accordance with the designated magnification m.

When the main scan starting clock C1 appears, a first counter 10 is cleared. At the same time the latch buffer 11 receives data V1' consisting of two least significant bits of pixel dot data V1. As is well known, data V1' include noise components and may be utilized as a source of random numbers. Thus, data V1' are used as table selecting data V1" for selecting an interpolation table at random from the four types of interpolation tables. The table selecting latch buffer 11 latches data V1' over a period corresponding to one scan line. The interpolation table selected by data V1" is retained over the period corresponding to one scan line (or may be retained over a period corresponding to several scan lines).

The first counter 10 is incremented one by one in synchronism with the synchronizing clock C2 for reading out the input pixels. At the same time, pixel dot data V1 are latched by the data latch buffer 12.

The first counter 10 outputs input pixel address data D1 to the table memory 8 which then outputs interpolation data D2 having a corresponding address of the interpolation table selected as above. Interpolation data D2 sets its value to a second counter 13. The second counter 13 counts the clock C3 having a higher frequency than that of input pixel synchronizing clock C2. The second counter 13 outputs a write clock C4 to the line memory 14 at every count of the clock C3 until the count reaches a predetermined value of interpolation data D2.

In this way, the transfer pixel dot data V2 outputted from the data latch buffer 12 are written into the line memory 14 in the number corresponding to the value of the interpolation data set to the second counter 13. No data writing takes place when the interpolation data is zero, thereby effecting skipping of data V2.

Data V1 is successively latched by the data latch buffer 12 in synchronism with the input pixel synchronizing clock C2. At the same time, the first counter 10 is incremented to successively designate subsequent addresses in the interpolation table. As a result, interpolation data D2 are renewed at positions corresponding to the designated addresses. The line memory 14 consists of two parts, for allowing alternation between writing for one scan line and writing for a next scan line. The data are read from one part while the data are written into the other.

When the operation moves on to a next scan line, the first counter 10 is cleared by the main scan starting clock C1. At the same time, a new interpolation table is selected for the table memory 8 by data V1' of the two least significant bits in the newly input data V1' i.e. by data V1".

Since data V1' shows random variations, the interpolation table selected for each scan line changes at random. As a result, the interpolating positions of the pixel for the current scan line are different from those for the previous scan line.

Interpolated pixel dot data V3 of the previous scan line for which data writing has been completed are read out in synchronism with the output transfer clock C5 provided by the pulse encoder EC. The photosensitive film 5 is exposed to the light beam emitted on and off from the recording head 3 in accordance with "1" and "0" in data V3, whereby a copy image is recorded in an enlarged or reduced size.

FIG. 9 is a flow chart showing an outline of the described operation of the image processing section 2.

Figures 10A, 10B:
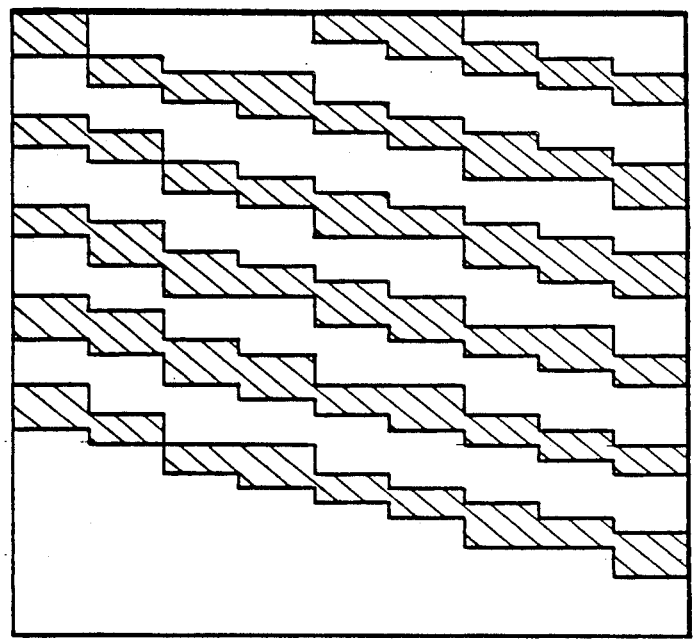
FIGS. 10A and 10B are views showing a modification of the first embodiment of this invention.
Figures 13, 14A:
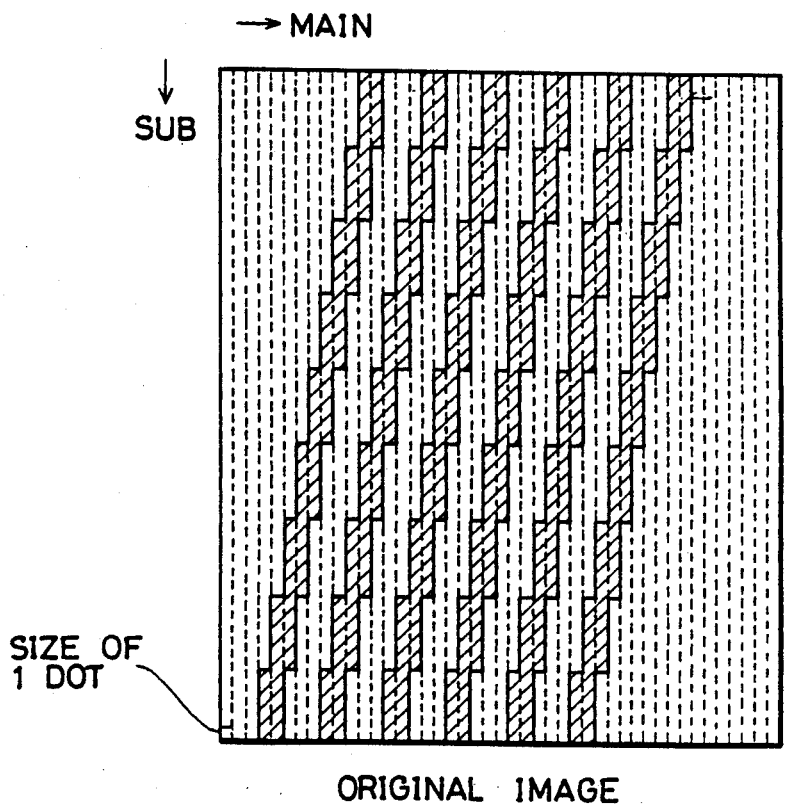
FIGS. 13 and 14A through 14C are views showing interpolated data in a conventional reproducing apparatus, and reproduced images to which the interpolated data are applied.
Figure 14C:
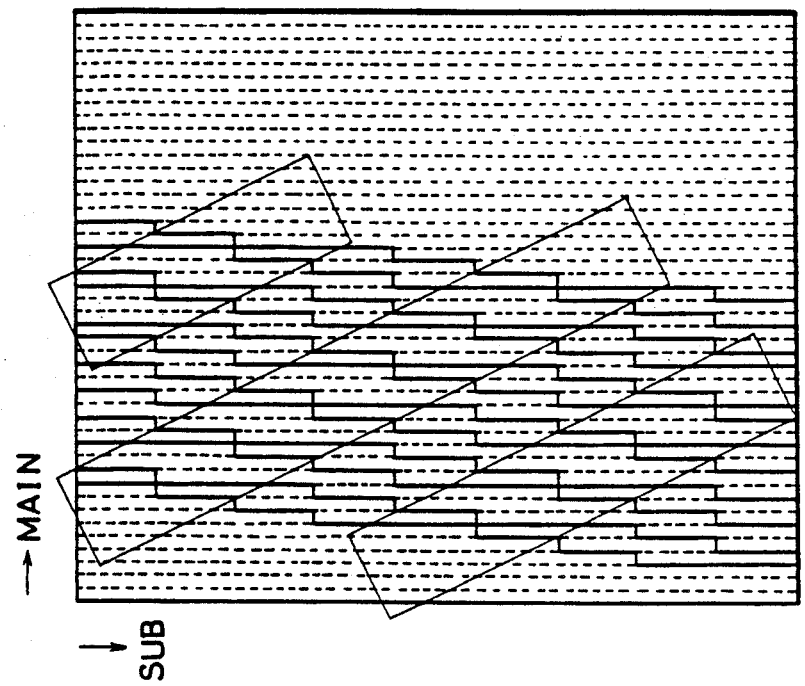
Figure 14B:
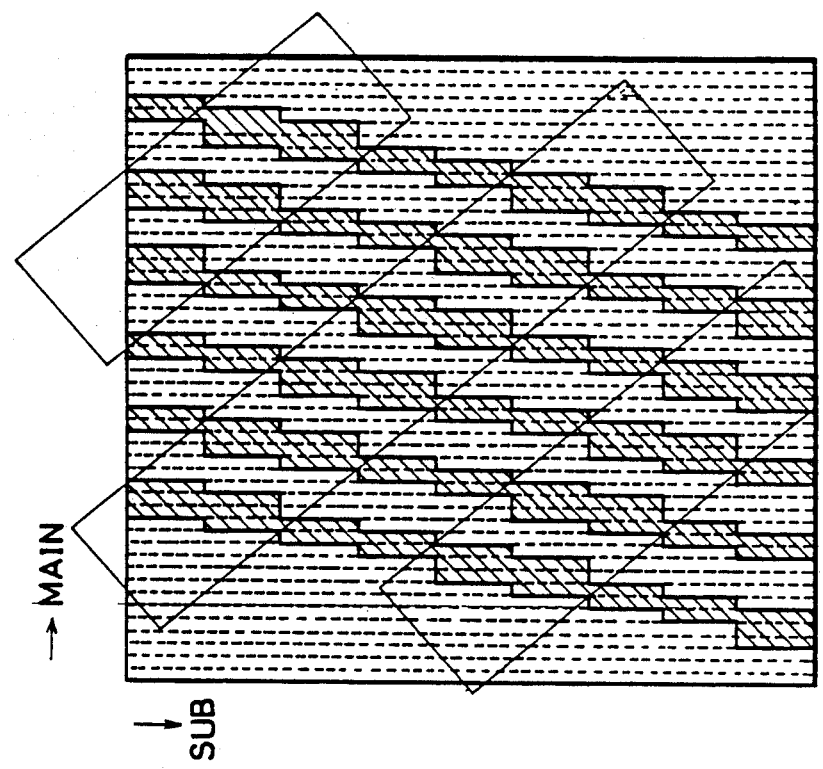

The foregoing embodiment has been described as having repeated pixels appearing a plurality of times within a certain region. This invention is not limited to such example of repeated pixels appearing plural times, but may be practiced with repeated pixels appearing only once. The latter is illustrated in FIGS. 10A and 10B. These drawings correspond to FIGS. 14B and 13 illustrating the conventional example, respectively. As shown in FIGS. 10A and 10B, positions in which repeated pixels appear are varied at random. This results in a reproduced image free from regular patterns.

(2) Second embodiment

Figure 11:
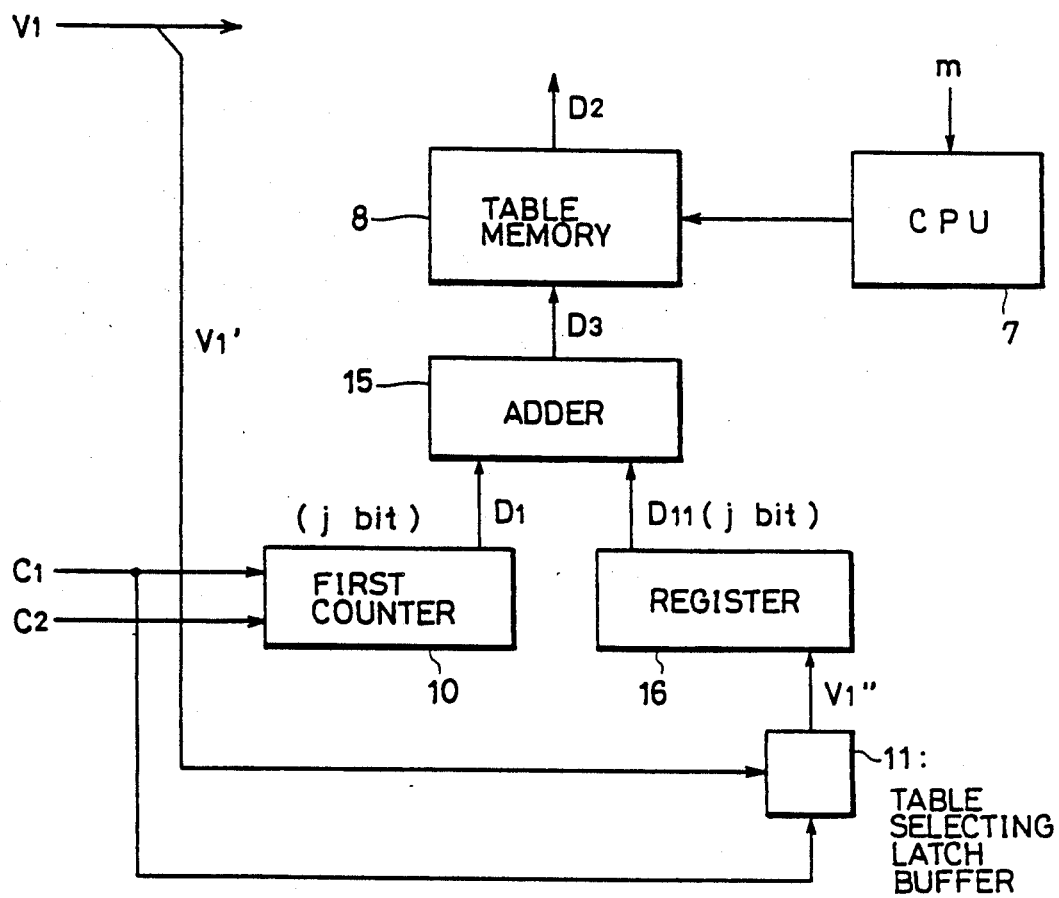
FIG. 11 is a block diagram showing principal portion of a second embodiment of this invention.
Figure 12:
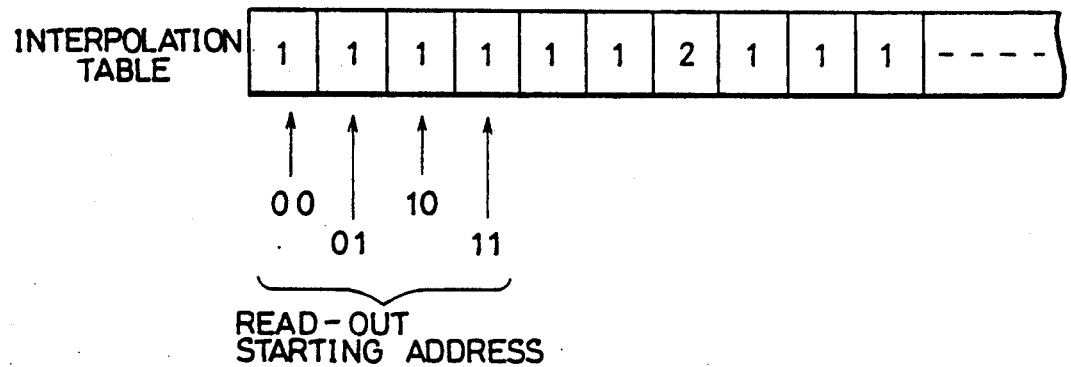
FIG. 12 is a view showing one example of interpolation tables according to the second embodiment of this invention.

In the second embodiment, only one type of interpolation table is prepared for each magnification, with its read starting address varied at random, the second embodiment of this invention will be described hereinafter with reference to FIGS. 11 and 12. FIG. 11 shows only the components different from those shown in FIG. 2.

CPU 7 shown in FIG. 11 prepares one type of interpolation table (see FIGS. 5 through 8) in accordance with selected magnification m, for storage in a table memory 8.

The second embodiment of this invention includes an adder 15 connected to an input end of the table memory 8. The adder 15 is connected at one input end thereof to a first counter 10 having j bits (j being determined according to the amount of interpolation data in the basic interpolation table prepared for each magnification) and at the other input end thereof to a register 16 also having j bits. The register 16 has the two least significant bits variable at random, with the (j−2) bit having a selected fixed value (which normally is zero). The first counter 10 is cleared by the main scan starting clock C1 and incremented by the synchronizing clock C2 for reading out the input pixels. A table selecting latch buffer 11 latches data V1' of the two least significant bits over the period corresponding to one scan line. The register 16 is set with data of the two least significant bits by table selecting data V1" transmitted from the table selecting latch buffer 11.

The adder 15 adds a signal D1 received from the first counter 10 and a signal D1 received from the register 16, and outputs the sum as a memory address signal D3 to the table memory 8. Since the two least significant bits in the signal D3 are variable at random by data V1' for each scan line, the first read-out starting address determined by the synchronizing clock C2 for reading out the interpolation table is variable into four types from address 0 to address 3.

As a result, substantially four types of interpolation tables are obtained which produce the effect equivalent to the effect of the first embodiment. The feature that only one type of interpolation table is required for each magnification provides the advantage of shortening the time consumed in preparing the interpolation tables.

In each of the foregoing embodiments, four interpolation tables are prepared. This invention is not limited to such embodiments but any selected number of interpolation tables may be prepared.

In the foregoing embodiments, data V1' of the two least significant bits in input pixel dot data V1 are utilized for varying the interpolation tables for each scan line. Alternatively, the output of a random number generating circuit may be utilized for this purpose.

In the second embodiment, the interpolation data in the basic interpolation table may be read out and processed in real time instead of preparing an interpolation table for each scan line.

In each of the described embodiments, the original image is reproduced as enlarged or reduced in the main scanning direction. Instead, the image may be reproduced as enlarged or reduced in the subscanning direction in the manner employed in the embodiments, by storing the pixel dot data of a previous scan line in a latch buffer corresponding to the latch buffer 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for reproducing an objective image by magnifying an original image with a magnification other than that expressed in an integer, comprising:
   image data generating means for outputting image data corresponding to each pixel of said original image,
   input means for inputting a selected reproducing magnification level,
   instruction data generating means for generating instruction data in accordance with said selected reproducing magnification level, said instruction data including interpolation data indicative of interpolating positions within a predetermined region of the reproduced image based on said selected reproducing magnification level,
   switch means for irregularly varying said interpolation data for said selected reproducing magnification level with predetermined timing,
   interpolating means for interpolating said image data in accordance with said instruction data, and
   means for recording said objective image scan line after scan line in accordance with said image data as interpolated,
   whereby said interpolating positions vary irregularly within a predetermined reproducing region.

2. An apparatus as claimed in claim 1, wherein said instruction data includes a plurality of data arranged in a predetermined order, said plurality of data being successively read from predetermined positions of said instruction data, and said switch means being operable to vary a read-out starting positions for said instruction data.

3. An apparatus as claimed in claim 1, wherein a plurality of said interpolation data are prepared for said predetermined region in accordance with said selected reproducing magnification level, said interpolation data being arranged substantially uniformly through said predetermined region.

4. An apparatus as claimed in claim 3, wherein said instruction data generating means is operable to prepare a plurality of said instruction data having different output positions of said interpolation data within said predetermined region in accordance with said selected reproducing magnification level, said switch means being operable to effect switching among the plurality of said instruction data.

5. An apparatus as claimed in claim 4, wherein said image is reproduced by outputting image data in a main scanning direction and in a subscanning direction intersecting said main scanning direction, said instruction data including instruction data for said main scanning direction.

6. An apparatus as claimed in claim 1, wherein said instruction data generating means is operable to prepare a plurality of said instruction data having different output positions of said interpolation data within said predetermined region in accordance with said selected reproducing magnification level, said switch means being operable to effect switching among the plurality of said instruction data.

7. An apparatus as claimed in claim 6, further comprising random number generating means for generating random number, said switch means being operable to effect switching among the plurality of said instruction data based on said random numbers.

8. An apparatus as claimed in claim 7, wherein said image is reproduced by outputting said data in a main scanning direction and in an subscanning direction intersecting said main scanning direction, said instruction data including instruction data for said main scanning direction.

9. An apparatus as claimed in claim 7, wherein said image is reproduced by outputting said data in a main scanning direction and in an subscanning direction intersecting said main scanning direction, said instruction data including instruction data for said subscanning direction.

10. An apparatus as claimed in claim 6, wherein said image is reproduced by outputting said data for each scan line, said predetermined timing corresponding to a cycle of scanning a predetermined number of lines.

11. An apparatus as claimed in claim 10, wherein said predetermined timing corresponds to timing for starting scanning of said predetermined number of lines.

12. An apparatus as claimed in claim 10, wherein said predetermined timing corresponds to timing for finishing scanning of said predetermined number of lines.

13. An apparatus as claimed in claim 6, wherein said instruction data generating means includes memory means for storing the plurality of said instruction data.

14. An apparatus as claimed in claim 13, wherein said image is reproduced by outputting said image data for each scan line, said predetermined timing corresponding to a cycle of scanning a predetermined number of lines.

15. An apparatus as claimed in claim 14, wherein said predetermined timing corresponds to timing for starting scanning of said predetermine number of lines.

16. An apparatus as claimed in claim 14, wherein said predetermined timing corresponds to timing for finishing scanning of said predetermined number of lines.

17. An apparatus as claimed in claim 15, further comprising random number generating means for generating random numbers, said switch means being operable to effect switching among the plurality of said instruction data based on said random numbers.

18. A method of reproducing an image from pre-recorded image data with a desired magnification other than that expressed in an integer, comprising the steps of:
   inputting the desired magnification,
   preparing instruction data for outputting pixel dot data to form said image,
   said instruction data including interpolation data for adding/skipping said pixel dot data to/from each predetermined region in accordance with said selected magnification, and
   switching positions of said interpolation data within said predetermined region at random with predetermined timing.

19. A method as claimed in claim 18, wherein said step of preparing instruction data for outputting pixel dot data to from said image includes the step of preparing a plurality of said instruction data having different output positions of said interpolation data within said predetermined region in accordance with said desired magnification, said random switching step including the step of switching among the plurality of said instruction data.

20. A method as claimed in claim 19, wherein said image is reproduced by outputting said pixel dot data for each scan line, said step of switching at random with predetermined timing including the step of switching among the plurality of said instruction data at random for each scan line.

21. A method as claimed in claim 20, wherein said step of switching at random with predetermined timing includes the steps of generating random numbers, and switching among the plurality of said instruction data in accordance with said random numbers.

22. An apparatus for creating a reproduced image from an original image, formed of individual pixels, at a magnification level other than an integer, comprising:
   image data generating means for outputting image data corresponding to each pixel of said original image;
   input means for inputting a selected reproducing magnification level;
   instruction data generating means for generating a plurality of interpolation tables for a single selected reproducing magnification level, said interpolation tables including data indicative of interpolating positions within a predetermined region of the reproduced image;
   switch means for randomly designating, at predetermined intervals, one of said interpolation tables;
   interpolating means for interpolating said image data in accordance with the interpolation table designated by said switch means; and
   means for recording said original image at said selected magnification level in accordance with said image data as interpolated for each scan line of the image;
   whereby said interpolating positions vary irregularly within the predetermined region.

* * * * *